Nov. 13, 1951 — A. C. KROLL — 2,574,791
PNEUMATIC SWITCH
Filed Nov. 1, 1948
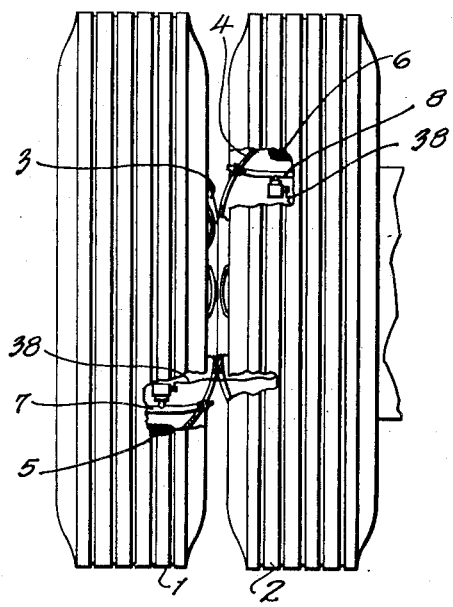
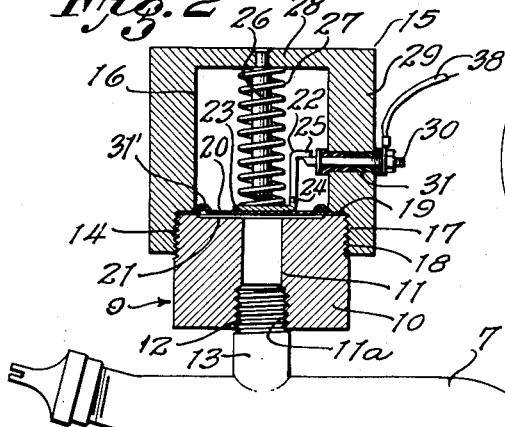
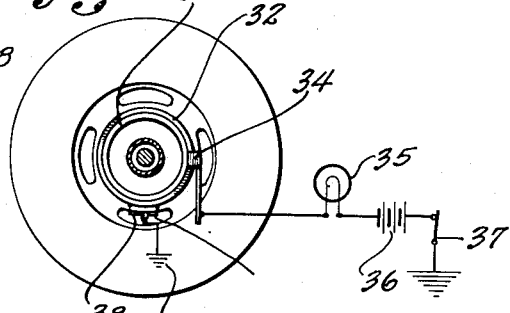
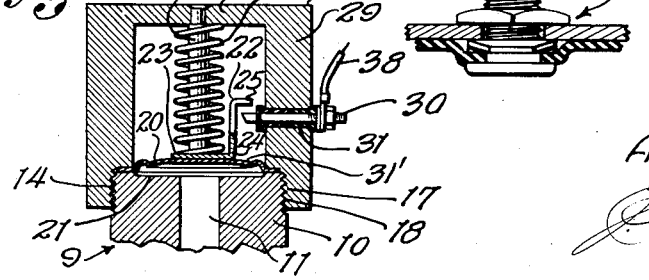
INVENTOR,
ALBERT C. KROLL;

Patented Nov. 13, 1951

2,574,791

UNITED STATES PATENT OFFICE 2,574,791

PNEUMATIC SWITCH

Albert C. Kroll, Maywood, Calif.

Application November 1, 1948, Serial No. 57,810

1 Claim. (Cl. 200—58)

The present invention relates to a pneumatic switch for controlling operation of an indicator or alarm resultant upon a switch being operated. Specifically, the invention has use in conjunction with the inner tubes of pneumatic tires.

The average trailer type truck is drawn by a prime mover which is usually independent of the trailer truck. Such trucks, for safety reasons, incorporate pairs of wheels, both provided with pneumatic tires. Often, some one of the tires becomes deflated due to punctures or other damage, unknown to the driver. Such a puncture will imposed an undue load upon the other pneumatic tire, and if the truck is heavily loaded, may result in serious accident if the single remaining wheel should become damaged. It is imperative that the pneumatic tires on all pairs of wheels be maintained in properly inflated condition. So far as the inventor is aware, there is no means at present employed whereby the operator of the prime mover is given any indication while in the cab of the prime mover, of the condition of the pneumatic tires on the trailer truck.

The present invention has for an object the provision of a means to be utilized in conjunction with the valves of pneumatic tires, which means will immediately signal a predetermined deflation of a tire to the driver of the vehicle.

A further object is the provision of a means for indicating dangerous deflation of a pneumatic tire, the signal being at a point remote from the said means.

A further object is the provision of a pneumatic switch which is inexpensive in cost of manufacture, easily installed, and capable of performing the function required of it in an expeditious manner.

With the above mentioned and other objects in view, the invention consists in the novel and useful provision, formation, construction, association, and relative arrangement of parts, members and features, all as shown in a certain embodiment in the accompanying drawing, described generally, and more particularly pointed out in the claim.

In the drawing:

Figure 1 is a fragmentary end elevation of a pair of pneumatic tires with the invention incorporated in the valve stems of said tires, Figure 2 is an enlarged view, partly in section, of an arrangement of the invention shown in connection with a valve stem, Figure 3 is a fragmentary view, partly in section, showing a moved position of certain elements of the invention from the position illustrated in Figure 2, and, Figure 4 is a wiring diagram for the invention.

Referring now to the drawing, I have shown in Figure 1 a pair of pneumatic tires 1 and 2, which are mounted on wheels 3 and 4, such wheels usually being associated in pairs when utilized on trucks. The pneumatic tires include inner tubes 5 and 6, the valve stems 7 and 8 of which extend through openings in the wheels to permit access to the valves. Usually the valve stems are situated 180° apart on a pair of wheels.

The device 9 of the invention is directly associated with the valve stems 7 and 8. This device includes a nut 10 provided with a central bore 11, and internally screw-threaded at 11ª for connection with threads 12 of a tube extension 13 secured to the stems 7 or 8. The nut is threaded externally at 14 for connection with a cap casing 15. Casing 15 is provided with a central bore 16 and with an enlarged diameter counterbore 17, the wall bounding the counter bore being threaded at 18 for connection with the screwthreads 14 of the nut. This construction provides an annular shoulder at 19. A flexible diaphragm 20 bridges the bore 16 and rests upon the shoulder 19. The nut is provided at its upper end with a circular recess 21, which circular recess has a diameter approximating that of the bore 16, and the said nut is adapted to clamp the diaphragm 20 against the shoulder 19. Bearing against the diaphragm is an arm 22, which arm has a foot 23, a portion 24 at right angles to the foot, and a contact portion 25 which parallels the foot 23. A pin 26 is centrally positioned in the casing and terminates above the foot 23 when the parts are in the position shown in Figure 2. Surrounding the pin 26 is a coil spring 27; one end of the coil spring engages the foot 23 of the arm while the other end engages a wall 28 of the casing. Passed transversely through the side wall 29 of the casing is a pin 30. This pin is surrounded by an insulation ferrule 31. One end of the pin extends inwardly of the bore 16 and in position to contact the end 25 of the arm when the parts are in the position shown in Figure 2.

To enhance the flexibility of the diaphragm 20, the diaphragm may be provided with an annular concavo-convex head 31'.

The operation, uses and advantages of the invention just described are as follows:

As previously stated, it is ordinary practice in trailer type trucks to provide rear wheels of a dual-nature, that is to say, pairs of pneumatically-tired wheels. If one of the tires becomes deflated, it is often impossible for the operator to ascertain this fact while driving the vehicle, but the imposed load on the other tire often causes a blow-out, or, if not a blow-out, will impose undue wear upon the single tire and perhaps damage to the deflated tire. The present invention is adapted to be secured to the stem of each pneumatic tire, and the device indicates, through suitable connections, to be described, a warning to the driver that one of the tires is below a normal pressure. The driver will be given an indication of which pair of pneumatic tires is at fault, whereupon he can correct the same either by increasing the pressure, or by examination to determine the cause of the deflation.

The device of the invention is utilized in the circuit shown in Figure 4, wherein a slip ring 32 is provided for each wheel, or between a pair of wheels, which slip ring is insulated from the wheel by means 33. A brush 34 has contact with the slip ring, the brush arm being insulated from the wheel and in circuit with an incandescent bulb 35, or other indication means in the driver's compartment. The incandescent bulb, in turn, is in circuit with a source of current 36 and through a control switch 37 to ground. Each of the pressure controlled switches of the invention have leads 38 connected to the slip ring 32. The casing 15 and the nut 10 are grounded through the stem 7 which is connected to the wheel rim in the ordinary manner, as shown in Figure 2, at 39. This provides the ground connection shown in Figure 4, at 40.

Assuming that the inner tube is to be inflated to a certain poundage, the arrangement is such that when air under pressure is applied to the valve stem, this air under pressure is by-passed through tube 13 against diaphragm 20 to move the diaphragm from the position of Figure 2 to that of Figure 3. The base or foot portion 23 of the arm will rise against the spring pressure to compress the spring until such base or foot contacts the end of the pin 36 to limit such upward movement. Movement of the diaphragm to the position of Figure 3 will elevate the end 25 from the pin 30, and in so doing, will break the connection. The spring 27 is selected to permit movement of the diaphragm to the position of Figure 3 when the tire is inflated above a certain poundage per square inch. If the tire falls below this poundage, the spring 27 will urge the diaphragm downwardly to bring the part 25 of the arm 22 into contact with pin 30, thus completing an electrical circuit to the light 35 on the instrument panel. The driver will immediately know that one of the tires of a pair is deflated below a given pressure.

I have shown my invention in its simplest embodiment. However, this assembly is simple of construction, and I have so related the length of screw-threads of the nut with reference to the threads of the casing that the contact arm and the pin will always be in alignment for cooperation when the casing is turned a certain amount relative to the nut. While the drawings show a device of considerable size, in actual practice, it is quite small and does not unduly unbalance a wheel. As previously stated, the valve stems 7 and 8 for each independent wheel are located 180° apart, and this fact, in cooperation with the devices of the invention, acts to balance the two wheels.

I claim:

In combination with an extension of the valve stem of a pneumatic tire, a nut fitted on said extension and provided with a bore leading from said extension through the nut, an external thread on the upper end of said nut, a diaphragm resting over the upper end of said nut and its bore, a cap casing formed with a depending internally threaded annular flange of larger internal diameter than the internal diameter of said cap casing, forming an annular shoulder between the internal diameter of said flange and the internal diameter of the cap casing, between which shoulder and the upper end of said nut is clamped the outer edge of said diaphragm, a fixed contact extending into said cap casing carried by said cap casing and insulated therefrom, a switch arm secured to said diaphragm in said cap casing and formed with a contact portion for disengaging said fixed contact, when the diaphragm is in its raised position under the influence of the normal pressure of the air in the tire to which said valve stem is connected, and a spring interposed between the upper wall of said cap casing and said switch arm, for forcing said diaphragm and said switch arm down until the contact portion of said arm engages the fixed contact when the diaphragm springs down, when the tire to which said valve stem is connected is deflated.

ALBERT C. KROLL.

REFERENCES CITED

The following references are of record in the file of this patent:

UNITED STATES PATENTS

| Number | Name | Date |
| --- | --- | --- |
| 1,294,923 | Long | Feb. 18, 1919 |
| 2,040,891 | Wright | May 19, 1936 |
| 2,063,452 | McDonnell | Dec. 8, 1936 |
| 2,296,411 | Wills | Sept. 22, 1942 |
| 2,362,883 | Cecil | Nov. 14, 1944 |

FOREIGN PATENTS

| Number | Country | Date |
| --- | --- | --- |
| 2,592 | Great Britain | Jan. 31, 1914 |